Aug. 23, 1932.   D. H. ANNIN   1,872,871
REMOTE CONTROL PILOT VALVE
Filed Feb. 12, 1929   3 Sheets-Sheet 1

INVENTOR
Douglas H. Annin,
BY Bradbury & Croswell,
ATTORNEYS.

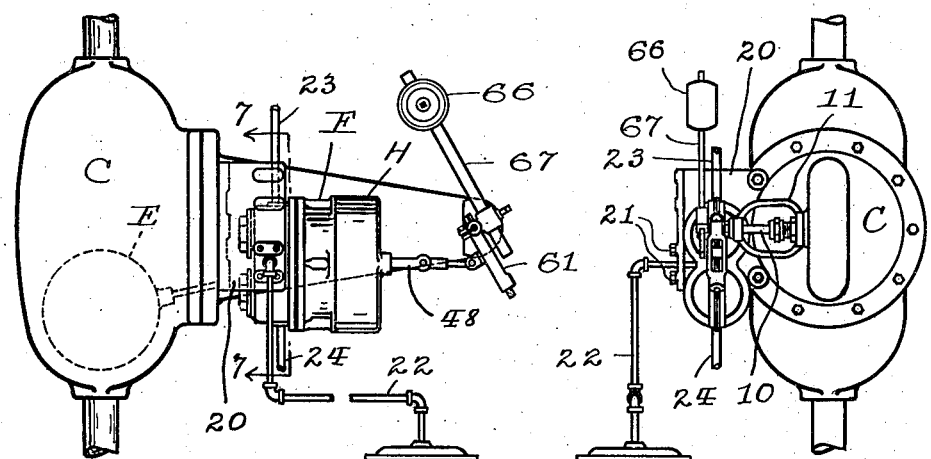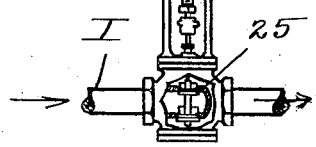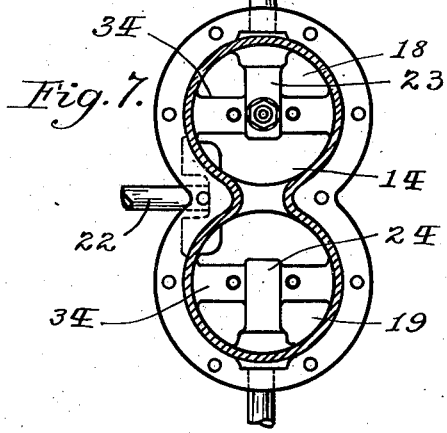

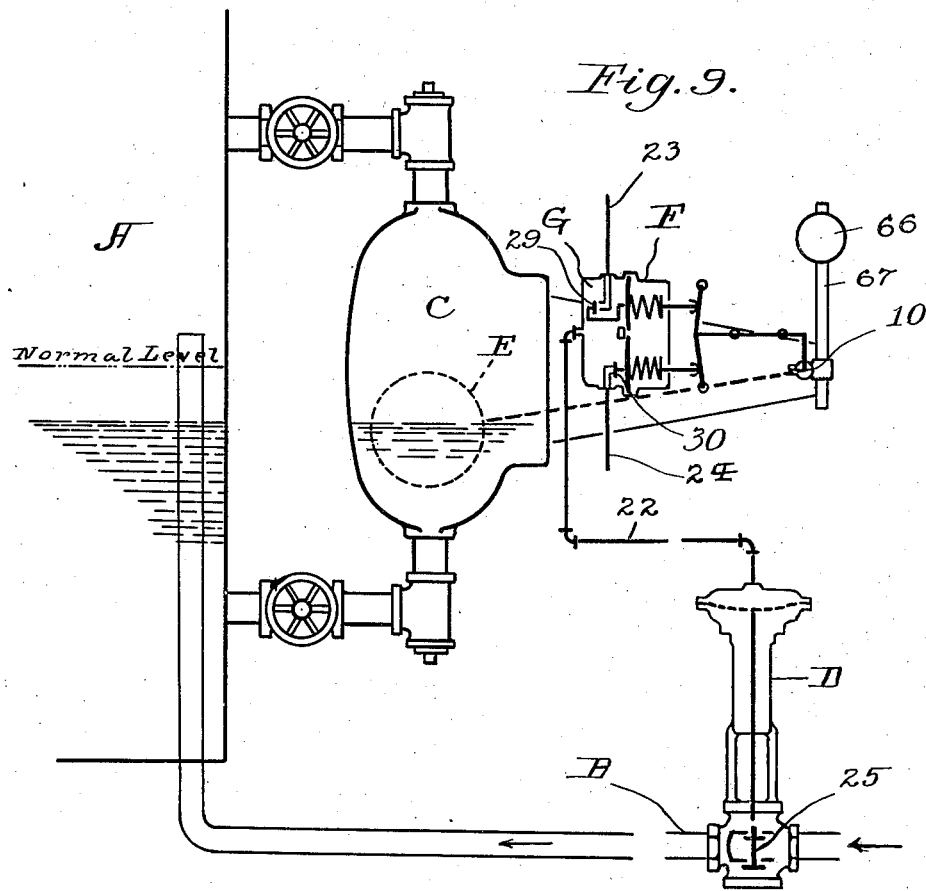

Patented Aug. 23, 1932

1,872,871

UNITED STATES PATENT OFFICE

DOUGLAS H. ANNIN, OF GLENDALE, CALIFORNIA, ASSIGNOR, BY MESNE ASSIGNMENTS, TO NEILAN CO., LTD., OF BOSTON, MASSACHUSETTS, A CORPORATION OF MASSACHUSETTS

REMOTE CONTROL PILOT VALVE

Application filed February 12, 1929. Serial No. 339,301.

This invention relates to means for automatically controlling the flow of a substance through a pipe line and refers particularly to improvements in a pilot controller forming part of such pipe line controlling system.

The general object of my invention is the provision of a perfectly balanced pilot controller. In control systems of the type here considered, it is common practice to cut a diaphragm motor valve into the pipe line to be controlled and to employ an actuating medium, such as compressed air, to operate this valve. In the pipe line conveying such actuating medium are placed pilot control valves, the operation of which usually is governed by the substance under control. More particularly my object is to provide means within such control system, whereby variations within the substance under control are employed to influence resilient members connected yieldingly to regulate the seating of such pilot valves.

Figure 1:
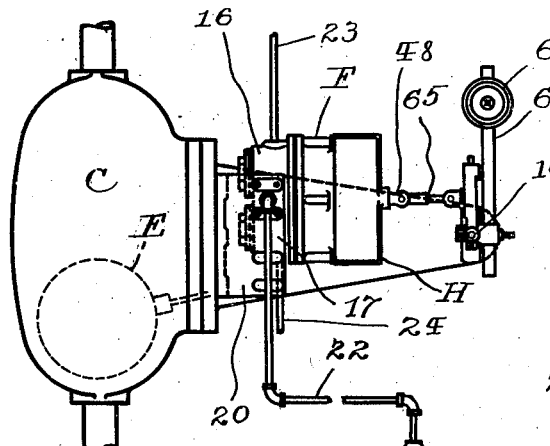
Figure 2:
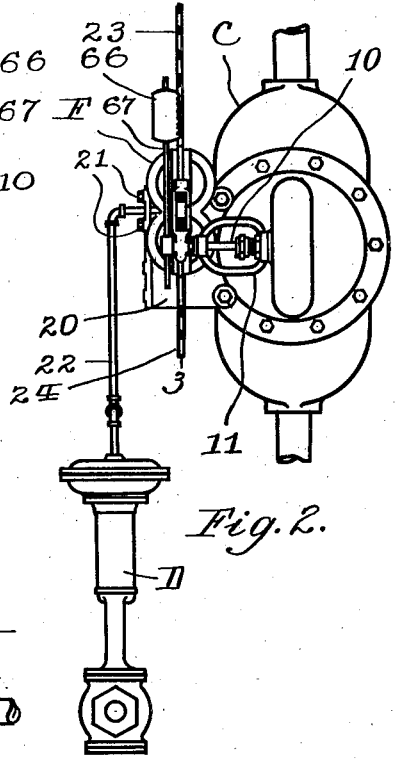
Figure 3:
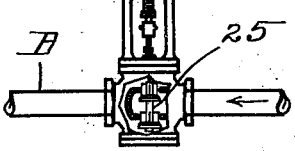
Figure 3:
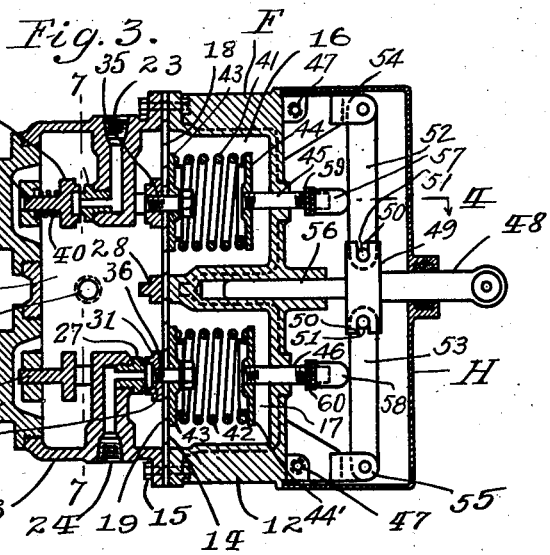
Figure 4:
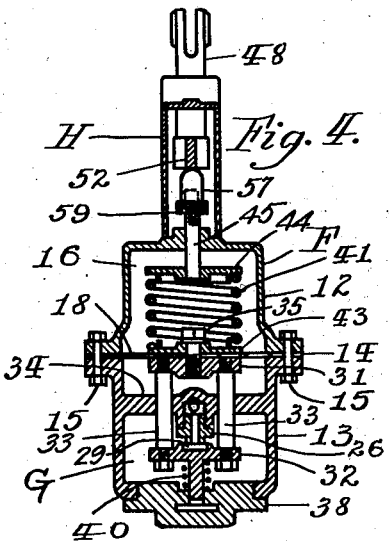

For the purpose of facilitating the reading of the following description, a structure embodying the invention is illustrated in the accompanying drawings, of which:

Fig. 1 is a side elevation of my improved pilot controller mounted upon a float chamber and connected to operate a main control valve, Fig. 2 is an end elevation substantially in agreement with Fig. 1, Fig. 3 is a vertical, longitudinal section of the pilot controller taken substantially on a line 3—3 of Fig. 2, Fig. 4 is a cross sectional view taken on line 4—4 of Fig. 3, Fig. 5 is a side elevation of the device showing certain modifications which will hereinafter be fully described, Fig. 6 is an end elevation substantially in agreement with Fig. 5, Fig. 7 is a sectional view taken on line 7—7 of Fig. 5, Fig. 8 is a detail view of certain connections hereinafter further referred to, and Fig. 9 is a diagrammatic view showing my invention in relation to a tank or reservoir and connected to control the liquid level within such tank.

Referring in the first instance to Fig. 9, the letter A designates a reservoir, the letter B a pipe line extending into this reservoir, and the letter C a float chamber communicating with the reservoir. The pipe line B is shown controlled by a diaphragm motor valve D. Within the float chamber is shown a float E, and the arm of this float is mounted on a shaft 10, which latter in turn is journaled in a bearing 11 of an extension of the float chamber, as best shown in Figs. 2 and 6. The pilot controller of my invention is designated by the letters F and G to comprise a pair of casings 12 and 13, clamped together by screws 15. A diaphragm 14 is shown seated between these two casings. The casing 13 is shown fastened to a bracket 20, extending from the float chamber, by means of bolts 21.

The diaphragm 14 divides the controller into a spring chamber and a valve chamber. The latter communicates, through a pipe 22, with the diaphragm motor valve D, and it is made with an ingress port 23 and an egress port 24 for controlling the flow of a suitable actuating medium through the pipe 22 to the diaphragm motor valve. As indicated in Fig. 7, the cross sectional outline of the pilot controller resembles a figure eight and, as the diaphragm 14 is clamped between the two parts of the controller casing, it follows, that this diaphragm is similarly shaped. The center portion of the diaphragm is shown clamped rigidly in position by means of a member 28. In this manner two independent, circular diaphragms 18 and 19 are provided.

On the diaphragm 18 is shown mounted a valve 29, through the medium of spaced rods 33, as best shown in Fig. 4. A valve seat 26 is shown alined with the valve 29, and this valve seat communicates with the port 23. The diaphragm portion 19 carries a valve 30 for engagement with a valve seat 27, which latter communicates with the port 24. Both diaphragms are moved, as will be described presently, to open and close the valves 29 and 30 for the purpose of controlling the flow of the actuating medium to the diaphragm motor valve. The ingress valve is shown yieldingly urged into closed position by a suitable spring 40.

The casing 12 is shaped to provide two cylindrical chambers 16 and 17, within which are concentrically mounted a pair of compression springs 41 and 42, between circular flanges 43, 44 and 43¹, 44¹, respectively. The flanges 43 and 44 are shown mounted on stems 45, 46, slidable in the wall of the casing.

A plunger 56 is seated to slide in the dividing wall between the spring chambers, and its outer end, 48, is guided in a cover H of the casing. This plunger carries a yoke 49, in the groove 50 of which are seated pins 51 of a pair of arms 52, 53, the outer ends of which are journaled at 54 and 55. When the yoke is pushed inwardly, it is seen that the arms are caused to force the stems 45, 46 inwardly, thereby to compress the springs 41, 42. The plunger 48 is, through the medium of a link 65 and an arm 61, connected for operation by the shaft 10 of the float E.

As shown in Fig. 9, the liquid level within the reservoir is below normal. The float E has dropped correspondingly, thereby causing the arm 61 to swing towards the pilot controller, to force the plunger 48 inwardly, resulting in a compression of the springs. The pressure of these springs urges a flection of the diaphragms towards the valve chamber, causing the valve 29 to open, against the tension of its spring 40, at the same time maintaining the valve 30 closed. The actuating medium now is free to pass through the valve chamber and the pipe line 22 to the diaphragm chamber of the diaphragm motor valve, causing the valve head 25 of the latter to open and to permit liquid to pass into the reservoir. The liquid level now commences to rise, causing the float to rise correspondingly and gradually to release the tension on the springs 41, 42. At the same time pressure has gradually built up within the valve chamber, and this pressure is exerted against the diaphragms to oppose the pressure of the springs.

The continued rise of the float results in a sufficient reduction of the spring pressure to flex the diaphragms in the opposite direction, and thereby to close the ingress valve and to open the egress valve 30. As the latter communicates with the atmosphere, it is seen, that this pressure within the valve chamber and within the diaphragm chamber of the diaphragm motor valve quickly is relieved, permitting the latter to close gradually, thereby to check the flow into the reservoir.

Pilot valves connected for direct operation by a float are well known in the art, and while theoretically satisfactory, do not operate very efficiently in practice, due to the lost motion present in the connections from the float to the valves. By introducing the springs 41, 42, it is readily seen, that the pressure of these springs operates to take up any lost motion that may occur, with the result that the slightest movement of the float instantly and directly is communicated through the springs and the diaphragms to the two pilot valves. The device is so sensitive, that the position of the pilot valves normally remains substantially constant, necessitating the consumption of but a very small amount of the actuating medium. The springs 41, 42, in functioning to absorb vibrations and shocks, due to lost motion and the like, tend to eliminate objectionable noises and to create a very silently operating device. Through the medium of screw caps 57, 58 and lock nuts 59, 60, of the stems 45, 46, the springs may be adjusted to the pressure of the actuating medium, permitting the device to operate at any pressure ordinarily employed.

The valves 29, 30 may conveniently be guided in the casing, and this may be accomplished, in the case of the valve 29, by forming it with a stem 27 seated to slide in a service cap 38. From the valve 30 extends a pair of rods, similar to the rods 33, to support a yoke terminating in a stem 37, and this stem is fitted to slide in a service cap 39.

On the float lever shaft 10 is shown mounted an arm 67, on which a weight 66 is adjustably secured. This weight serves to counterbalance the float and its arm. By referring to Fig. 8, it is noticed that the arm 61 carries an adjustable member 63, to which the connecting link 65 is pivotally attached. A very small movement of the fulcrum member, on the arm 61, has a decided influence on the sensitiveness of the device.

While, in Figs. 1 and 2, the pilot controller is shown mounted above the center of the float lever fulcrum, it is noticed that, in Figs. 5 and 6, the controller takes a symmetrical position below this fulcrum. In the first case the device is fitted to control the flow into a reservoir, in the latter, to control the flow from the reservoir. The parts may, in either case, all remain the same. The only difference in assembling the device, in addition to the relocation of the pilot controller, is that the arm 61 is taken off the shaft 10 and reversed before it is put back.

While in the drawings I have shown the pilot controller connected for operation by a float mechanism, in response to liquid level variations within a reservoir, I wish it understood, that the device of my invention may be used in connection with other means controlled by pressure, flow, temperature or the like to control the flow through a pipe line.

Having described my invention, what I claim as new and desire to secure by Letters Patent is:

1. A pilot controller comprising, a casing, a pair of diaphragms dividing said casing into a chamber for the passage of an actuating fluid to a diaphragm valve controlling the fluid in a reservoir and a spring balance chamber, valves on said diaphragms controlling ingress and egress ducts of said first named chamber, springs in said spring balance chamber for exerting pressure against said diaphragms to open said ingress and close said egress duct, and means operable by the fluid in said reservoir to adjust the tension of said springs.

2. The combination with a diaphragm valve for controlling the fluid within a reservoir, of a pilot controller having ingress and egress ducts for an actuating fluid and provided with a passage for said actuating fluid to the said diaphragm valve, a pair of diaphragms in said controller, valves operable by said diaphragms to control said ducts, resilient means for exerting pressure against said diaphragms to open said ingress and close said egress ducts, and means actuated by the fluid within said reservoir for adjusting the tension of said resilient means.

3. The combination with a reservoir and a diaphragm valve for controlling the fluid of said reservoir, of a pilot controller having ingress and egress ducts for an actuating fluid and a passage for said fluid to the said diaphragm valve, a pair of diaphragms in the controller, valves operable by said diaphragms to control said ducts, springs for moving said diaphragms to open the ingress and close the egress ducts, mean controlled by the reservoir fluid to adjust the tension of said springs, and resilient means yieldingly opposing the opening of said ingress duct.

4. The combination with a float chamber and a diaphragm valve for controlling a fluid in said chamber, of a pilot controller having ingress and egress ducts for an actuating fluid and provided with a passage for said fluid to said diaphragm valve, valves controlling said ingress and egress ducts, diaphragms for operating said valves, springs pressing against said diaphragms to open said ingress and close said egress ducts, and a float in said chamber connected to adjust the tension of said springs relative to the fluid level within the chamber.

5. The combination with a float pivotally hung in a float chamber and a diaphragm valve for controlling the fluid level of said chamber, of a pilot controller for passing an actuating fluid to said pilot valve, valves for controlling ingress and egress ducts of said pilot controller, springs for exerting pressure against said valves to open and close said ducts, and levers operatively connecting the pivot of said float with the said springs for the purpose of adjusting the tension of said springs proportionate to the fluid level within said float chamber.

6. The combination with a float chamber and a diaphragm valve for controlling the fluid level in said chamber, of a pilot controller for passing an actuating fluid to said diaphragm valve, valves for controlling ingress and egress ducts of said pilot controller, and means operable by a float in said chamber yieldingly to press against said valves for the purpose of controlling the opening and closing of said ingress and egress ducts.

7. The combination with a float chamber and a diaphragm valve for controlling the fluid level in said chamber, of a pilot controller for passing an actuating fluid to said diaphragm valve, valves for controlling ingress and egress ducts of said pilot controller, means operable by a float of said chamber yieldingly to press against said valves to control the opening and closing of said ducts, and means counterbalancing said float.

8. In a pilot controller, the combination with the float lever of a float chamber, of valves for controlling ingress and egress ducts for the passage of an actuating fluid, resilient means for operating said valves in opposition to the force exerted by said actuating fluid, levers operatively connecting said float with the said resilient means for the purpose of adjusting the latter relative to the movement of a float, and means for adjusting the throw of said levers relative to the movement of the float.

9. The combination with a diaphragm valve for controlling the flow through a pipe line, of a pilot controller having ingress and egress ducts for an actuating medium and provided with a passage for said medium to the said diaphragm valve, a pair of diaphragms in said controller, valves operable by said diaphragms to control said ducts, resilient means for exerting pressure against said diaphragms to open said ingress and close said egress ducts, and means actuated by variations in the substance under control for adjusting the tension of said resilient means.

10. A pilot controller comprising, a casing, a pair of diaphragms dividing the casing into a chamber for the passage of an actuating medium to a pipe line controlling valve and into a spring balance chamber, valves on said diaphragms controlling ingress and egress ducts of said first named chamber, springs in said spring balance chamber for exerting pressure against said diaphragms to open said ingress and close said egress ducts, and means operable by variations in the substance under control to adjust the tension of said springs.

In testimony whereof, I have signed my name to this specification.

DOUGLAS H. ANNIN.